(12) United States Patent
Bastien

(10) Patent No.: US 12,045,602 B2
(45) Date of Patent: Jul. 23, 2024

(54) CORRECTNESS VERIFICATION SYSTEM, METHOD, DEVICE, AND PROGRAM

(71) Applicant: WOVEN BY TOYOTA, INC., Tokyo (JP)

(72) Inventor: Jean-Francois Bastien, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 104 days.

(21) Appl. No.: 17/704,086

(22) Filed: Mar. 25, 2022

(65) Prior Publication Data

US 2023/0305829 A1 Sep. 28, 2023

(51) Int. Cl.
G06F 11/36 (2006.01)
G06F 8/65 (2018.01)

(52) U.S. Cl.
CPC .......... *G06F 8/65* (2013.01); *G06F 11/3664* (2013.01); *G06F 11/3672* (2013.01)

(58) Field of Classification Search
CPC .................. G06F 11/3664; G06F 11/3688
See application file for complete search history.

(56) References Cited

U.S. PATENT DOCUMENTS

| | | | | |
|---|---|---|---|---|
| 2008/0109475 A1* | 5/2008 | Burmester | .............. | G06F 40/30 |
| | | | | 707/999.102 |
| 2010/0153924 A1* | 6/2010 | Andrews | ................. | G06F 30/33 |
| | | | | 717/126 |
| 2016/0048375 A1* | 2/2016 | Balkan | .................... | G06F 30/20 |
| | | | | 717/104 |
| 2018/0077061 A1 | 3/2018 | Horn et al. | | |
| 2019/0108045 A1 | 4/2019 | Lee et al. | | |
| 2020/0125687 A1* | 4/2020 | Zeller | ....................... | G06F 8/10 |
| 2021/0281577 A1 | 9/2021 | Sasaki et al. | | |

OTHER PUBLICATIONS

Marieke Huisman, et al. "Software that Meets its Intent", Springer International Publishing, 2016, pp. 609-625, (17 pages).

(Continued)

*Primary Examiner* — Duy Khuong T Nguyen
(74) *Attorney, Agent, or Firm* — Sughrue Mion, PLLC

(57) ABSTRACT

A method for determining correctness of properties in components of a system, executed by an electronic device, the method comprising: setting known properties of the components of the system; dynamically determining unknown properties of the components of the system, wherein the dynamically determining comprises: defining one or more pre-conditions for an operation, wherein the one or more pre-conditions must be satisfied for the operation to be performed correctly; defining one or more post-conditions for the operation, wherein the one or more post-conditions must be satisfied after the operation being performed correctly; and identifying boundaries of the unknown properties of the components of the system through testing; verifying the known properties of the components of the system and the unknown properties of the components of the system; and updating Interface Definition Language (IDL) program code to reflect the known properties of the components of the system and unknown properties of the components of the system.

20 Claims, 4 Drawing Sheets

(56) References Cited

OTHER PUBLICATIONS

Zhen Zhang, "xWIDL: Modular and Deep JavaScript API Misuses Checking Based on extended WebIDL", SPLASH Companion '16, Systems, Programming, Languages and Applications: Software for Humanity, Oct. 30-Nov. 4, 2016, pp. 63-64 (2 pages total).

Yan Jin, et al., "Runtime Validation of Behavioural Contracts for Component Software", QSIC 2005, Proceedings of the Fifth International Conference On Quality Software, Sep. 19-20, 2005, Melbourne, Australia, pp. 177-184 (9 pages total).

* cited by examiner

CORRECTNESS VERIFICATION SYSTEM, METHOD, DEVICE, AND PROGRAM

BACKGROUND

Correctness verification in pure software, embedded systems, and networks is generally a time consuming task. As software programs and embedded systems are getting more and more complex, correctness verification of these complex systems becomes exponentially more difficult, especially in edge cases or corner cases where unexpected behavior happens. Further, while there exist languages and programming environments which encode higher-level constraints and correctness, they are usually very domain-specific and need to be handled in ways unique to that domain.

SUMMARY

According to embodiments, a method for determining correctness of properties in components of a system is provided. The method, executed by an electronic device, includes setting known properties of the components of the system; dynamically determining unknown properties of the components of the system, wherein the dynamically determining includes: defining one or more pre-conditions for an operation, wherein the one or more pre-conditions must be satisfied for the operation to be performed correctly; defining one or more post-conditions for the operation, wherein the one or more post-conditions must be satisfied after the operation being performed correctly; and identifying boundaries of the unknown properties of the components of the system through testing; verifying the known properties of the components of the system and the unknown properties of the components of the system; and updating Interface Definition Language (IDL) program code to reflect the known properties of the components of the system and unknown properties of the components of the system.

According to one aspect of the disclosure, a non-transitory computer-readable medium storing instructions is provided. The non-transitory computer-readable medium includes one or more instructions that, when executed by one or more processors of a device predict a word sense, cause the one or more processors to: set known properties of the components of the system; dynamically determine unknown properties of the components of the system, wherein the dynamically determining includes: define one or more pre-conditions for an operation, wherein the one or more pre-conditions must be satisfied for the operation to be performed correctly; define one or more post-conditions for the operation, wherein the one or more post-conditions must be satisfied after the operation being performed correctly; and identify boundaries of the unknown properties of the components of the system through testing; verify the known properties of the components of the system and the unknown properties of the components of the system; and update Interface Definition Language (IDL) program code to reflect the known properties of the components of the system and unknown properties of the components of the system.

According to another aspect of the disclosure, a device for determining correctness of properties in components of a system is provided. The device includes: a memory configured to store instructions; and one or more processors configured to execute the instructions to: set known properties of the components of the system; dynamically determine unknown properties of the components of the system, wherein the dynamically determining includes: define one or more pre-conditions for an operation, wherein the one or more pre-conditions must be satisfied for the operation to be performed correctly; define one or more post-conditions for the operation, wherein the one or more post-conditions must be satisfied after the operation being performed correctly; and identify boundaries of the unknown properties of the components of the system through testing; verify the known properties of the components of the system and the unknown properties of the components of the system; and update Interface Definition Language (IDL) program code to reflect the known properties of the components of the system and unknown properties of the components of the system.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
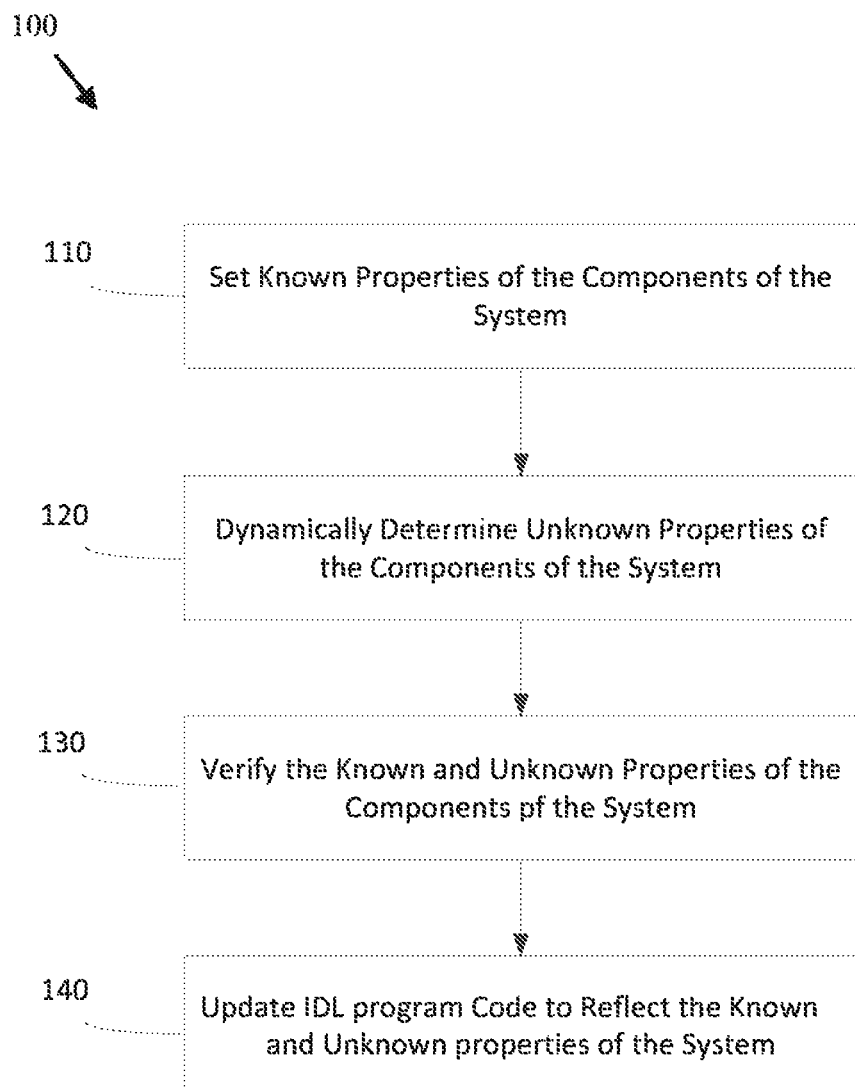
FIG. 1 is a diagram of a flow chart of an example process for determining correctness of properties in components of a system, according to embodiments.

Embodiments of the present disclosure may relate to verifying correctness of software, firmware, or hardware. Programs generally specify their semantics at a program code level, often over constraining the solution and making verification exponentially complex. So, even if a program code or hardware design works as implemented, it is hard to make sure the program code or hardware works as intended. This is especially true for domains which require verification of all components such as high availability, security, functional safety, privacy, resource utilization, etc. While some languages and programming environments encode higher-level constraints to verify correctness, these are often very domain specific and not always appropriate application domains.

Embodiments of the present disclosure relate to augmenting existing programming languages and paradigms which are well-accepted in their domains with correctness, contracts, constraints, and bounds information that may be encoded into a system. For example, using Interface Definition Languages, correctness, contracts, constraints, and bounds information may be encoded into the system to verify that these properties of the system are upheld when the system is in use.

According to embodiments of the present disclosure, verifying that the properties of the system or properties of the components of the system are upheld may include verification that these properties are upheld in an operational envelop of the system. An operational envelope may be a description of the factors that affect a system. According to some embodiments, an operational envelope may be a structured definition of the system, a formal specification, or a description of the state space for the system which may be used in testing and certification of the system or an aspect of the system. For example, in the context of autonomous vehicles, an operational envelope may include a description of all the environmental and other factors that the autonomous vehicle may encounter while operating.

Vehicles, robotics, and other safety related devices, typically include one or more electronic computing units (ECUs) and one or more communication mechanisms between these ECUs. Some of these devices may be safety-critical and may have to follow certification standards or prove proper operation bounds to ensure functional safety. Embodiments of the present disclosure are directed to implementing correctness verifiers for properties associated with functional safety, security, privacy, resource utilization, energy utilization, etc. For example, correctness verifiers may validate properties such as worst-case execution time, worst-case scheduling, racing for resources in distributed systems, error propagation, worst-case network usage, ensuring non-conflicting implementation of safety and certification standards, etc. As an example, correctness verifiers may validate properties and identify bounds relating to code implementing Automotive Safety Integrity Levels (ASIL) for autonomous vehicles to ensure that the autonomous vehicle is functionally safe.

According to embodiments, such important properties of components may be encoded through constraints, contracts, or conditions into the IDL layer. Since IDLs are designed to be programming language independent, i.e., IDLs are designed to enable communication from a program in one programming language to another program in another programming language, encoding constraints, contracts, or conditions in IDLs may allow the components of the system to be more portable. Additionally, encoding constraints, contracts, or conditions in IDLs may make it easier to re-use the components of the system on other platforms and may make it easier to update the components through methods such as over-the-air updates.

In addition to improved portability, composability of the components of the system may also improve because of encoding constraints, contracts, or conditions in IDLs. According to embodiments, different components may be combined, re-implemented, or discarded because boundaries of the inputs and outputs of the properties of the components may be known and may be verified.

These benefits of improved portability and composability may not be limited to purely software components. Correctness verifiers according to embodiments of the present disclosure may be applied in simulations as well as with hardware. When simulations may be "buggy" or the simulations may have different designs than real hardware, correctness verifiers may be used to identify situations, states, or conditions under which the behavior of the components of the system diverges between the two. Thus, in addition to improved portability and composability, embodiments of the present disclosure may provide identification of situations, states, or conditions in which properties of the components of the system behave differently. This identified difference may then be used to redesign the simulation or the real hardware to improve performance of the overall system. This identified difference may also be used to co-design hardware and software by identifying what hardware design properties or features may be useful or harmful for a specific software goal.

For example, embodiments of the present disclosure may be used to identify the situations, states, or conditions in which properties of the components of an autonomous vehicle behave differently in simulations and actual vehicles. This divergence may be used to test the hardware and identify if the hardware may work as expected under a variety of specific cases, speeding up hardware testing and reducing the amount of time needed to validate the correctness of the hardware components. This divergence may also be used to determine what components of the actual autonomous vehicle (ECUs, sensors, sensor placement and calibration, etc.) or what components of the software of the autonomous vehicle work together or need to be redesigned.

Thus, embodiments of the present disclosure provide correctness verifiers for a plurality of important properties. The important properties being tested in simulation as well as real hardware may allow for improved and faster designing of both the software and hardware components of the system and a reduction in human effort and costs involved in designing the software and hardware components of the system. Further, encoding these properties in IDLs improves the portability and composability of the components of the system, effectively improving the efficiency of the components of the system.

FIG. 1 is a diagram of an overview of an embodiment described herein. As shown in FIG. 1, a process 100 may determine correctness of properties in components of a system.

As shown in FIG. 1, at operation 110, known properties of the components of the system may be set. The known properties of the components of the system may include properties that we want the component of the system to uphold or verify. Known properties of components of the system may be set based on a specification of the system. The specification of the system may be a formal or informal description of what the system is supposed to do or must not do. In a formal specification, properties of a components of the system may be represented using a specific structure such as a syntax or domain specific semantics. This formal structure may be used to infer information about and relationship between properties of the components of the system. In embodiments, specific languages may be used to describe a specification, the languages may include but not be limited to abstract state machines (ASMs), Java Modelling Language (JML), a computational logic for Applicative Common Lisp (ACL2), etc. As an example, in the case of a vehicle or an autonomous vehicle, a known property of a breaking component may be that a break command issued may have a maximum latency of 20 ms. This known property may be set based on a formal specification or may be obtained or extracted from a law or certification standard.

However, in some embodiments, in addition to or in the absence of formal specification, according to embodiments of the present disclosure, the setting of the known properties of the components of the system may include analyzing a design of the system; analyzing a configuration of the system, or analyzing a code of the system by programmatic derivation. Setting known properties of components of the system may include, in some embodiments, analyzing program code (e.g., high level languages like object oriented programming languages, low-level languages such as assembly-level languages, or binary code). Program code may be analyzed using static program analysis or using dynamic program analysis, may be analyzed manually or automatically. In some embodiments, analyzing program code may include partially executing a program in real-time or in a simulation. In some embodiments, analyzing a design of the system or components of the system may include analyzing a model-based specification. An example may include a property of a component being set based on analyzing a system state model. In some embodiments, the setting of the known properties of the components of the system may include identifying known properties from a model of the system. Embodiments of the present disclosure are not intended to be limiting. Any known method state of the art method may be used for analyzing a design of the system; analyzing a configuration of the system, or analyzing a code of the system by programmatic derivation to set known properties of components of the system.

The known properties of the components of the system may be associated with at least one of functional safety, security, privacy, energy utilization, and resource utilization. For example, known properties may be based on an industry certification standards associated with functional safety, privacy, security, resource utilization, error propagation, internal and external sensors, or communication within the system.

At operation 120, unknown properties of the components of the system may be dynamically determined. Unknown properties of the components of the system may be unforeseeable properties, properties whose bounds unknown or properties whose nature may be inferred from the one or more sources. For example, unknown properties of the components of the system may include properties of the components of the system that may not be explicitly specified in a formal specification and which may have to be inferred from the partial execution of program code.

The unknown properties of the components of the system may be associated with at least one of functional safety, security, privacy, energy utilization, and resource utilization. For example, unknown properties may be based on an unforeseeable event or failure associated with functional safety, privacy, security, resource utilization, error propagation, internal and external sensors, or communication within the system.

According to some embodiments, dynamically determining unknown properties of the components of the system may include defining one or more pre-conditions for an operation, wherein the one or more pre-conditions may be satisfied for the operation to be performed correctly. A pre-condition may include conditions, assertions, or system states that must be true prior to the performance of an operation or must be true for the performance of the operation. An operation may be the execution of the functionalities or sub-parts associated with a property of the component of the system. As an example, for an autonomous or automatic vehicle lane change operation to occur, a pre-condition that must be true may include to "turn signals must be on."

According to some embodiments, dynamically determining unknown properties of the components of the system may include defining one or more post-conditions for the operation, wherein the one or more post-conditions may be satisfied after the operation being performed correctly. A post-condition may include conditions, assertions, or system states that must be true subsequent to the correct performance of an operation or must be true to indicate a correct performance of the operation. As an example, subsequent to a correct automatic lane change operation of an autonomous or automatic vehicle, a post-condition that must be true may include "turn signals must be off if no other immediate lane change is to be performed."

According to some embodiments, dynamically determining unknown properties of the components of the system may include identifying boundaries of the unknown properties of the components of the system through testing. Identifying boundaries of the unknown properties of the components of the system enables understanding of the unknown properties and the values and system states associated with them. This identification of boundaries may also be essential to identify corner-cases or edge cases which may occur rarely but may cause the components of the system to act unusually. As stated before, complicated systems may be used in safety-critical systems where even though edge cases or corner-cases occur extremely rarely, they may have a huge impact when they do occur.

According to embodiments of the system, identifying or to proving the boundaries of the unknown properties of the components of the system may be done statically or dynamically. Boundaries of unknown properties of the components of the system may be identified or proven statically using mathematical proofs or tools. However, one method to determine boundaries dynamically may be based on why, how, and where the static proofs fail or cannot be determined. Some properties of the components of the system may be unbound in theory, but when practically executed, tested, or applied, practical limits may emerge that may help identify practicable boundaries of the properties. According to embodiments of the disclosure, one or more test plans or test programs may be generated based on the identified boundaries of the unknown properties of the components of the system. The generated test plans or test programs may be used to test all known or unknown properties dynamically or may be used to statically test enough cases to be reasonably certain that the known or unknown properties of the components of the system may be upheld in the operating envelope of the system. In some embodiments, the generated test plans or test programs may be further refined to test the performance of specific properties of the components of the system.

In some embodiments, identifying boundaries of the unknown properties of the components of the system through testing may include testing on a simulated system. In some embodiments, identifying boundaries of the unknown properties of the components of the system through testing may include testing hardware components. In some embodiments, identifying boundaries of the unknown properties of the components of the system through testing may include testing on a simulated system and may include testing hardware components.

As stated above, according to embodiments of the present disclosure may be testing may be performed in simulations as well as on hardware. When simulations may be "buggy" or the simulations may have different designs than real hardware, testing using both simulations and hardware may be used to identify situations, states, or conditions under which the behavior of the components of the system diverges between the two. It may also help find incorrect solutions and boundaries resulting from incorrect assumptions about the components of the system or the overall system. Thus, embodiments of the present disclosure may provide identification of situations, states, or conditions in which known or unknown properties of the components of the system behave differently. This identified difference may then be used to redesign the simulation or the real hardware to improve performance of the overall system. This identified difference may also be used to co-design hardware and software by identifying what hardware design properties or features may be useful or harmful for a specific software goal.

At operation 130, the known properties of the components of the system and the unknown properties of the components of the system may be verified.

In some embodiments, the verifying may be based on determining whether the known properties of the components of the system and the unknown properties of the components of the system may be upheld within an operational envelope of the system. Determining that the known properties of the components of the system and the unknown properties of the components of the system being upheld within an operational envelope of the system may include determining that the components of the system or the overall system performed as expected. To determine whether the components of the system or the overall system performed as expected, a list of expected behavior of the components of the system or the overall system may be used. In some embodiments, the list of expected behavior of the components of the system or the overall system may be manually written. The some embodiments, the list of expected behavior of the components of the system or the overall system may be coded. As an example, the expected behavior may be coded using programming languages through constraints, contracts, and conditions. In some embodiments, the expected behavior may be based on industry certification standards or laws. According to embodiments, the list of expected behavior of the components of the system or the overall system may be in the form of a formal or informal specification. In embodiments where the list of expected behavior of the components of the system or the overall system may be in the form of an informal specification such as an industry standard or program code, any suitable technique such as machine learning, natural language processing, or automatic program analysis may be used to generate the list.

In some embodiments, the verifying the known properties of the components of the system and the unknown properties of the components of the system may be performed using a boolean satisfiability solver. As an example, the verifying the known properties of the components of the system and the unknown properties of the components of the system may be performed using a SAT solver such as a Davis-Putman-Logemann-Loveland (DPLL) solver, a Conflict Driver Clause Learning (CDCL) solver, a parallel SAT solver, etc. In some embodiments, the verifying the known properties of the components of the system and the unknown properties of the components of the system may be performed using a first-order verification engine. For example, the verifying the known properties of the components of the system and the unknown properties of the components of the system may be performed using Satisfiability Modulo Theories (SMT) solvers.

In some embodiments, the verifying the known properties of the components of the system and the unknown properties of the components of the system may be performed based on a fuzzy meaning or approximate meaning of correctness. As an example, a fuzzy meaning of correctness may be used in some embodiments, the known or unknown properties of the components of the system may be boundless or testing every known or unknown property of the components of the system may be too resource intensive. For example, a machine-learned model to classify the images of traffic signs on a road in an autonomous vehicle may be verified as correct if the model identified particular properties and upheld those properties in sample datasets for a particular percentage of attempts. Integrating this fuzzy meaning of correctness may help the system verify some resource intensive properties. This may optimize the use of resources in the system by verifying a property using fewer resources.

According to some embodiments, the verifying the known properties of the components of the system and the unknown properties of the components of the system may include determining a worst-case execution time associated with the known properties of the components of the system or the unknown properties of the components of the system. In some embodiments, the verifying the known properties of the components of the system and the unknown properties of the components of the system may include determining a worst-case error propagation associated with the known properties of the components of the system or the unknown properties of the components of the system. In some embodiments, the verifying the known properties of the components of the system and the unknown properties of the components of the system may include determining a worst-case scheduling associated with the known properties of the components of the system or the unknown properties of the components of the system. In some embodiments, the verifying the known properties of the components of the system and the unknown properties of the components of the system may include determining a worst-case network usage associated with the known properties of the components of the system or the unknown properties of the components of the system.

At operation 140, Interface Definition Language (IDL) program code to reflect the known properties of the components of the system and unknown properties of the components of the system may be updated. In some embodiments, the IDL program code may be updated automatically based on the results of the verification of the known properties of the components of the system and the unknown properties of the components of the system. In some embodiments, the IDL program code may be updated manually based on the results of the verification of the known properties of the components of the system and the unknown properties of the components of the system.

Although FIG. 1 shows example blocks of process 100, in some implementations, processes 100 may include additional blocks, fewer blocks, different blocks, or differently arranged blocks than those depicted in FIG. 1. In embodiments, one or more blocks of example blocks of process 100 may be combined or arranged in any order or amount. In embodiments, two or more of the blocks of processes 100 may be performed in parallel.

Figure 2:
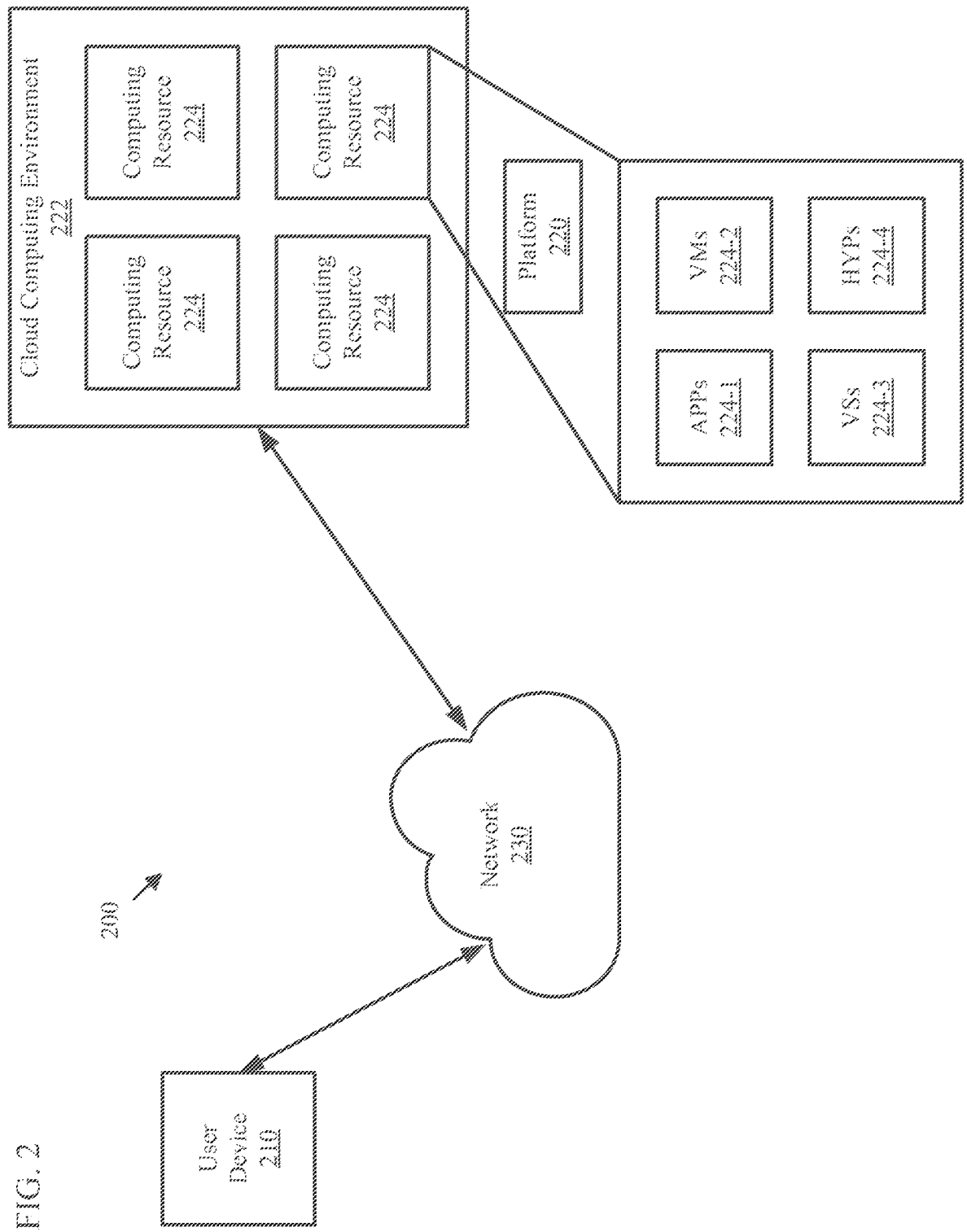
FIG. 2 is a diagram of an example environment in which systems and/or methods, described herein, may be implemented, according to embodiments.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions of the elements included in network management system 100 may be performed by any combination of elements illustrated in FIG. 2. For example, in embodiments, user device 210 may perform one or more functions associated with user device 106, and platform 220 may perform one or more functions associated with any of degradation trigger module 102, procedure identification module 104, correlation module 106, matching module 108, or new anomaly identification module 110.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device, an autonomous vehicle (e.g., an autonomous car, an unmanned aerial vehicle, a drone, etc.). In some implementations, user device 210 may receive information from and/or transmit information to platform 220.

Platform 220 includes one or more devices capable of determining a property of the components of the system, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
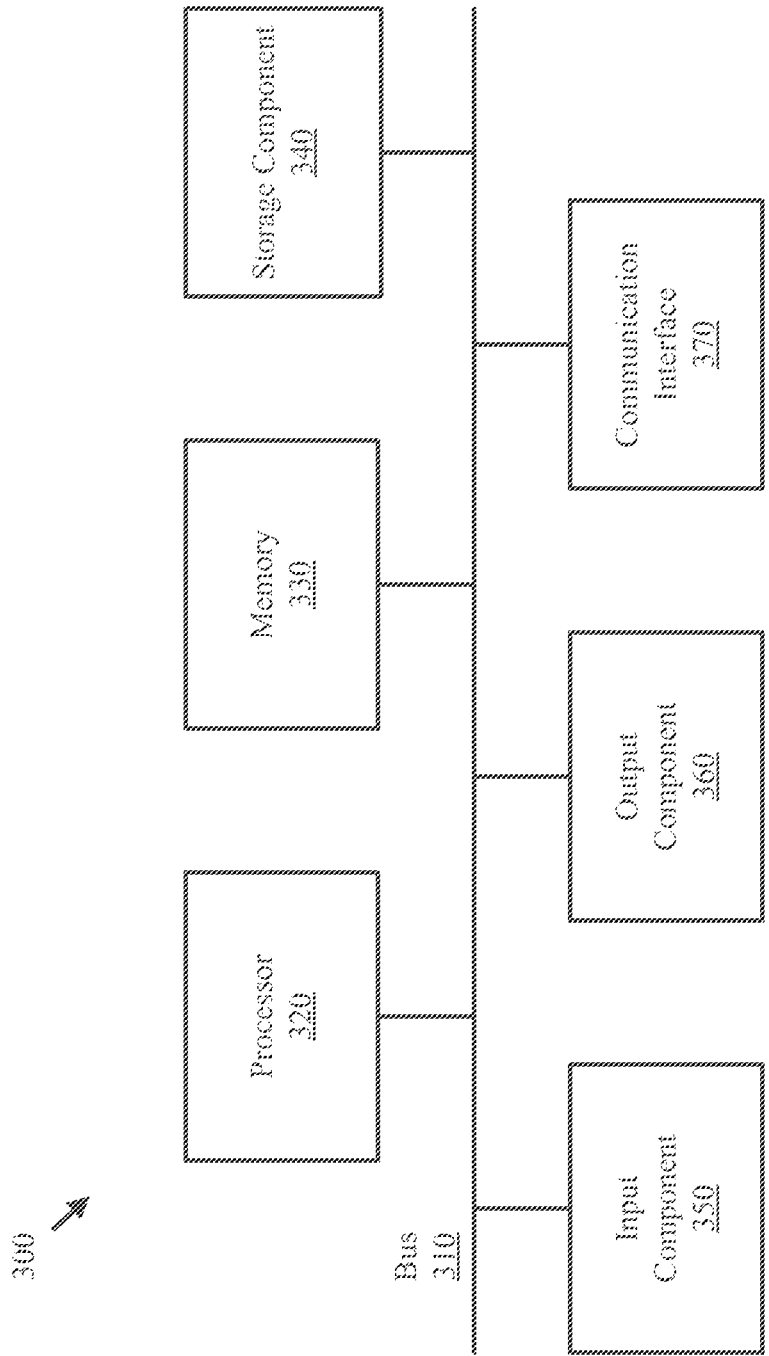
FIG. 3 is a diagram of example components of one or more devices of FIG. 2, according to embodiments.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), an electronic control unit (ECU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations of FIG. 1 may be implemented by or using any one of the elements illustrated in FIGS. 2-3. For example any of the one or more operations 110-140 may be implemented by or correspond to any one or more of user device 210, platform 220, computing resource 224, or one or more components of device 300.

Figure 4:
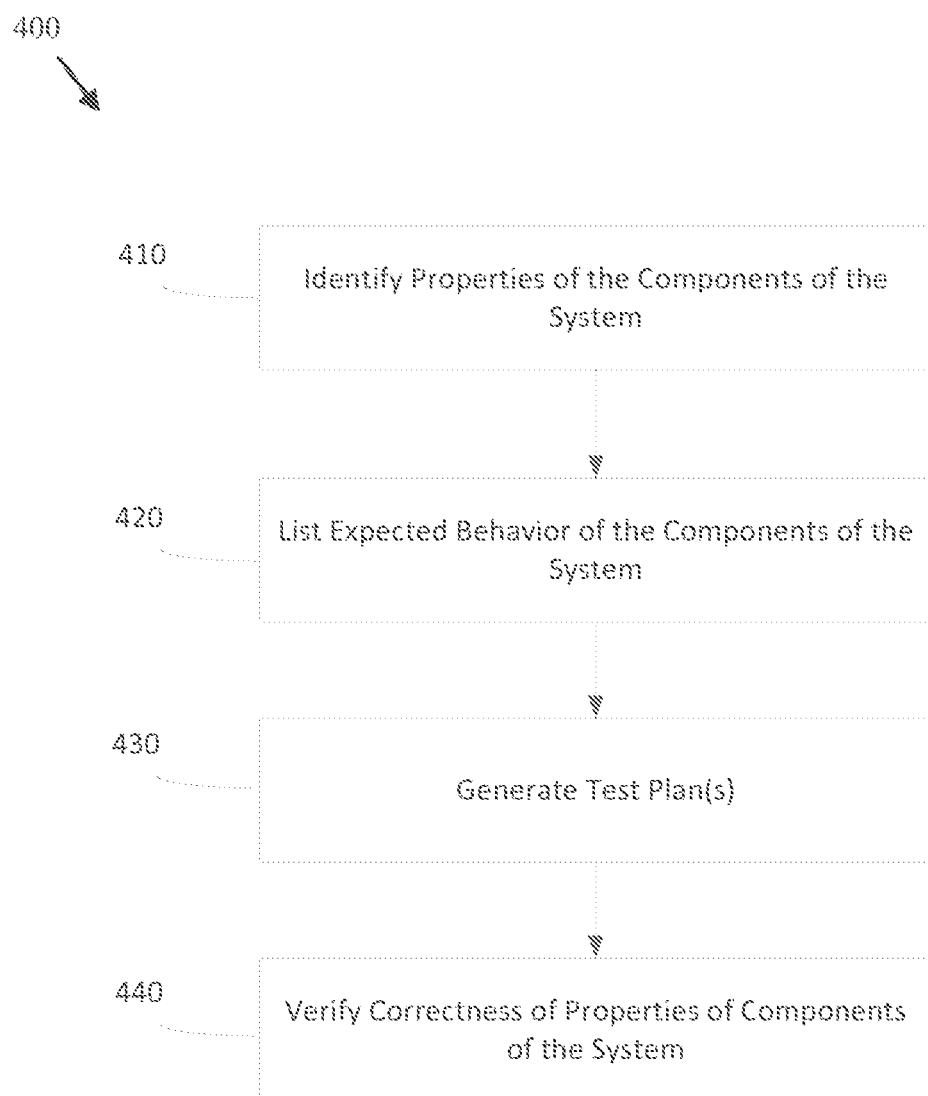
FIG. 4 is a flow chart of an example process for determining correctness of properties in components of a system, according to embodiments.

FIG. 4 is a diagram of an overview of an embodiment described herein. As shown in FIG. 4, a process 400 may generate test plans or test programs to verify correctness of properties in components of a system.

As shown in FIG. 4, at operation 410, properties of the components of the system may be identified. Properties of the components of the system may include known properties of the components of the system and unknown properties of the system. Known properties of components of the system may be set identified on a specification of the system. The specification of the system may be a formal or informal description of what the system is supposed to do or must not do. In a formal specification, properties of a components of the system may be represented using a specific structure such as a syntax or domain specific semantics. This formal structure may be used to infer information about and relationship between properties of the components of the system. In embodiments, specific languages may be used to describe a specification, the languages may include but not be limited to abstract state machines (ASMs), Java Modelling Language (JML), a computational logic for Applicative Common Lisp (ACL2), etc. As an example, in the case of a vehicle or an autonomous vehicle, a known property of a breaking component may be that a break command issued may have a maximum latency of 20 milliseconds. This known property may be identified based on a formal specification or may be obtained or extracted from a law or certification standard.

However, in some embodiments, in addition to or in the absence of formal specification, according to embodiments of the present disclosure, identifying the known properties of the components of the system may include analyzing a design of the system; analyzing a configuration of the system, or analyzing a code of the system by programmatic derivation.

In some embodiments, identifying properties of the components of the system may include dynamically determining unknown properties of the components of the system. In some embodiments, dynamically determining unknown properties of the components of the system may include defining one or more pre-conditions for an operation, wherein the one or more pre-conditions may be satisfied for the operation to be performed correctly. Then, one or more post-conditions for the operation may be defined, wherein the one or more post-conditions may be satisfied after the operation being performed correctly. Finally, boundaries of the unknown properties of the components of the system may be identified through testing.

The known properties of the components of the system and unknown properties of the components of the system may be associated with at least one of functional safety, security, privacy, energy utilization, and resource utilization. For example, known properties may be based on an industry certification standards associated with functional safety, privacy, security, resource utilization, error propagation, internal and external sensors, or communication within the system.

At operation 420, expected behavior of the components of the system may be listed. In some embodiments, the list of expected behavior of the components of the system or the overall system may be manually written. The some embodiments, the list of expected behavior of the components of the system or the overall system may be coded. As an example, the expected behavior may be coded using programming languages through constraints, contracts, and conditions. In some embodiments, the expected behavior may be based on industry certification standards or laws. According to embodiments, the list of expected behavior of the components of the system or the overall system may be in the form of a formal or informal specification. In embodiments where the list of expected behavior of the components of the system or the overall system may be in the form of an informal specification such as an industry standard or program code, any suitable technique such as machine learning, natural language processing, or automatic program analysis may be used to generate the list.

At operation 430, test plans or test programs to verify correctness of the properties may be generated based on the identified properties of the components of the system and the expected behavior of the components of the system. According to embodiments of the disclosure, one or more test plans or test programs may be generated based on identified boundaries of the known properties of the components of the system and the unknown properties of the components of the system. The generated test plans or test programs may be used to test all known or unknown properties dynamically or may be used to statically test enough cases to be reasonably certain that the known or unknown properties of the components of the system may be upheld in the operating envelope of the system. In some embodiments, the generated test plans or test programs may be further refined to test the performance of specific properties of the components of the system.

At operation 440, the correctness of the properties of the components of the system may be verified based on the generated test plans or test programs. Verifying the correctness of the properties of the components of the system based on the generated test plans or test programs may include testing or determining whether the known properties of the components of the system and the unknown properties of the components of the system may be upheld within an operational envelope of the system. Determining that the known properties of the components of the system and the unknown properties of the components of the system being upheld within an operational envelope of the system may include determining that the components of the system or the overall system performed as expected. To determine whether the components of the system or the overall system performed as expected, the list of expected behavior of the components of the system or the overall system may be used.

In some embodiments, the verifying the correctness of the known properties of the components of the system and the unknown properties of the components of the system may be performed using a Boolean satisfiability solver. As an example, the verifying the correctness of the known properties of the components of the system and the unknown properties of the components of the system may be performed using a SAT solver such as a Davis-Putman-Logemann-Loveland (DPLL) solver, a Conflict Driver Clause Learning (CDCL) solver, a parallel SAT solver, etc. In some embodiments, the verifying the known properties of the components of the system and the unknown properties of the components of the system may be performed using a first-order verification engine. For example, the verifying the known properties of the components of the system and the unknown properties of the components of the system may be performed using Satisfiability Modulo Theories (SMT) solvers.

In some embodiments, the verifying the known properties of the components of the system and the unknown properties of the components of the system may be performed based on a fuzzy meaning or approximate meaning of correctness. As an example, a fuzzy meaning of correctness may be used in some embodiments, the known or unknown properties of the components of the system may be boundless or testing every known or unknown property of the components of the system may be too resource intensive.

Although FIG. 4 shows example blocks of process 400, in some implementations, processes 400 may include additional blocks, fewer blocks, different blocks, or differently arranged blocks than those depicted in FIG. 4. In embodiments, one or more blocks of example blocks of process 400 may be combined or arranged in any order or amount. In embodiments, two or more of the blocks of processes 400 may be performed in parallel.

In embodiments, the information indicating the problem scenario may include information identifying the network malfunction and a sample signaling trace captured based on the network malfunction.

In embodiments, the sample signaling trace may indicate a plurality of key performance indicators corresponding to the network malfunction.

Although FIG. 7 shows example blocks of process 700, in some implementations, processes 700 may include additional blocks, fewer blocks, different blocks, or differently arranged blocks than those depicted in FIG. 7. In embodiments, one or more blocks of example blocks of process 700 may be combined or arranged in any order or amount. In embodiments, two or more of the blocks of processes 700 may be performed in parallel. Each of the operations of processes 400 and 700 may be performed by any device in FIGS. 2-3.

The embodiments of the present disclosures refer to the accompanying drawings. The same reference numbers in different drawings may identify the same or similar elements.

The present disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As used herein, the term component is intended to be broadly construed as hardware, firmware, software, software feature or function, or a combination thereof.

What is claimed is:

1. A method for determining correctness of properties in components of a system, executed by an electronic device, the method comprising:
    setting known properties of the components of the system;
    dynamically determining unknown properties of the components of the system, wherein the dynamically determining comprises:
        defining one or more pre-conditions for an operation, wherein the one or more pre-conditions must be satisfied for the operation to be performed correctly;
        defining one or more post-conditions for the operation, wherein the one or more post-conditions must be satisfied after the operation being performed correctly; and
        identifying boundaries of the unknown properties of the components of the system through testing;
    verifying the known properties of the components of the system and the unknown properties of the components of the system,
        wherein the verifying the unknown properties of the components of the system comprises correctly identifying the boundaries of the unknown properties and upholding the boundaries of the unknown properties for a predetermined percentage of attempts; and
    updating Interface Definition Language (IDL) program code to reflect the known properties of the components of the system and unknown properties of the components of the system.

2. The method of claim 1, wherein the identifying the boundaries of the unknown properties of the components of the system through testing comprises testing on a simulated system.

3. The method of claim 1, wherein the identifying the boundaries of the unknown properties of the components of the system through testing comprises testing hardware components.

4. The method of claim 1, wherein the system is an autonomous vehicle.

5. The method of claim 1, wherein the verifying the known properties of the components of the system and the unknown properties of the components of the system comprises at least one of:
    determining a worst-case execution time;
    determining a worst-case error propagation;
    determining a worst-case scheduling; and
    determining a worst-case network usage.

6. The method of claim 1, wherein the setting the known properties of the components of the system comprises analyzing a design of the system; analyzing a configuration of the system, or analyzing a computer code of the system by programmatic derivation.

7. The method of claim 1, wherein the verifying is based on determining whether the known properties of the components of the system and the unknown properties of the components of the system are upheld within an operational envelope of the system.

8. The method of claim 1, wherein the identifying the boundaries of the unknown properties of the components comprises identifying corner-cases associated with the unknown properties of the components.

9. The method of claim 1, wherein the verifying comprises verifying a non-conflicting implementation of code associated with different Automotive Safety Integrity Levels (ASIL); and
    wherein verifying the known properties of the components of the system and the unknown properties of the components of the system is performed using a satisfiability modulo theories solver (SMT solver).

10. The method of claim 1, wherein the verifying the known properties of the components of the system and the unknown properties of the components of the system is performed using a first-order logic verification engine.

11. The method of claim 1, wherein the known properties of the components of the system and the unknown properties of the components of the system are associated with at least one of functional safety, security, privacy, energy utilization, and resource utilization.

12. A device for determining correctness of properties in components of a system, the device comprising:
    a memory configured to store instructions; and
    one or more processors configured to execute the instructions to:
        set known properties of the components of the system;
        dynamically determine unknown properties of the components of the system, wherein the dynamically determining comprises:
            define one or more pre-conditions for an operation, wherein the one or more pre-conditions must be satisfied for the operation to be performed correctly;
            define one or more post-conditions for the operation, wherein the one or more post-conditions must be satisfied after the operation being performed correctly; and
            identify boundaries of the unknown properties of the components of the system through testing;
        verify the known properties of the components of the system and the unknown properties of the components of the system,
            wherein the verifying the unknown properties of the components of the system comprises correctly identifying the boundaries of the unknown properties and upholding the boundaries of the unknown properties for a predetermined percentage of attempts; and update Interface Definition Language (IDL) program code to reflect the known properties of the components of the system and unknown properties of the components of the system.

13. The device of claim 12, wherein the identifying the boundaries of the unknown properties of the components of the system through testing comprises testing on a simulated system.

14. The device of claim 12, wherein the identifying the boundaries of the unknown properties of the components of the system through testing comprises testing hardware components.

15. The device of claim 12, the verifying the known properties of the components of the system and the unknown properties of the components of the system comprises at least one of:
   determining a worst-case execution time;
   determining a worst-case error propagation;
   determining a worst-case scheduling; and
   determining a worst-case network usage.

16. The device of claim 12, wherein the setting the known properties of the components of the system comprises analyzing a design of the system; analyzing a configuration of the system, or analyzing a computer code of the system by programmatic derivation.

17. The device of claim 12, wherein the verifying the known properties of the components of the system and the unknown properties of the components of the system is performed using a satisfiability modulo theories solver (SMT solver).

18. The device of claim 12, wherein the identifying the boundaries of the unknown properties of the components comprises identifying corner-cases associated with the unknown properties of the components.

19. The device of claim 12, wherein the known properties of the components of the system and the unknown properties of the components of the system are associated with at least one of functional safety, security, privacy, energy utilization, and resource utilization.

20. A non-transitory computer-readable medium storing instructions, the instructions comprising: one or more instructions that, when executed by one or more processors of a device predict a word sense, cause the one or more processors to:
   set known properties of the components of the system;
   dynamically determine unknown properties of the components of the system, wherein the dynamically determining comprises:
      define one or more pre-conditions for an operation, wherein the one or more pre-conditions must be satisfied for the operation to be performed correctly;
      define one or more post-conditions for the operation, wherein the one or more post-conditions must be satisfied after the operation being performed correctly; and
      identify boundaries of the unknown properties of the components of the system through testing;
   verify the known properties of the components of the system and the unknown properties of the components of the system,
      wherein the verifying the unknown properties of the components of the system comprises correctly identifying the boundaries of the unknown properties and upholding the boundaries of the unknown properties for a predetermined percentage of attempts; and
   update Interface Definition Language (IDL) program code to reflect the known properties of the components of the system and unknown properties of the components of the system.

* * * * *